United States Patent [19]

Naruse et al.

[11] 4,397,533
[45] Aug. 9, 1983

[54] PHOTOGRAPHIC LIGHT MEASURING DEVICE

[75] Inventors: Kazuhiko Naruse, Sakai; Yoshio Yuasa, Kawachi-Nagano; Norio Ishikawa, Osaka, all of Japan

[73] Assignee: Minolta Camera Kabushiki Kaisha, Osaka, Japan

[21] Appl. No.: 315,135

[22] Filed: Oct. 26, 1981

Related U.S. Application Data

[63] Continuation of Ser. No. 199,102, Oct. 20, 1980, abandoned.

[30] Foreign Application Priority Data

Nov. 20, 1979 [JP] Japan .............................. 54-151186

[51] Int. Cl.³ .............................................. G03B 7/08
[52] U.S. Cl. ................... 354/23 D; 354/53; 354/289
[58] Field of Search ................ 354/23 D, 53 E, 53 L, 354/289

[56] References Cited

U.S. PATENT DOCUMENTS

| | | | |
|---|---|---|---|
| 3,982,254 | 9/1976 | Ito et al. | 354/23 D |
| 4,028,712 | 6/1977 | Kawamura et al. | 354/23 D |
| 4,081,813 | 3/1978 | Kawamura et al. | 354/23 D |
| 4,114,995 | 9/1978 | Stieringer et al. | 354/23 D |
| 4,191,458 | 3/1980 | Kawamura et al. | 354/289 |
| 4,262,997 | 4/1981 | Yuasa | 354/23 D |

Primary Examiner—Russell E. Adams
Attorney, Agent, or Firm—Watson, Cole, Grindle & Watson

[57] ABSTRACT

In a photographic light measuring device, a light output signal representing light reflected from an object to be photographed is converted into digital signals. At least first and second setting means generate respective first and second digital set signals which are respectively variable in response to respective manual operations. Photographic exposure data signals are generated using the digital light signal and the first and second set digital signals such that indicating means can selectively indicate data commensurate with the first and second digital set signals.

6 Claims, 9 Drawing Figures

PHOTOGRAPHIC LIGHT MEASURING DEVICE

This is a continuation of application Ser. No. 199,102 filed Oct. 20, 1980, now abandoned.

BACKGROUND OF THE INVENTION

1. Field of the Invention

The present invention relates to a photographic light measuring device for use in an automatic exposure control and/or an exposure indicating device of a camera, in an exposure meter, in a colorimeter or the like, and more particularly it pertains to a photographic light measuring device which is capable of digitally displaying measured values and set input data.

2. Description of the Prior Art

In a known photographic light measuring device which enables digital display of measured values and set input data, there is provided an indicating means for monitoring set input data. With such means, the user manually operates input data setting means observing the display of the indicating means until a desired value is reached, and then the manual operation is stopped to determine the setting.

With automatic exposure control and an indicating device, for example, exposure factor data, such as film sensitivity and shutter speed, have to be set for automatic diaphragm control. For this purpose, the set film sensitivity and shutter speed values are electrically indicated by segment display means in two display windows, respectively, so that, observing the display, the camera operator can change the film sensitivity and the shutter speed settings, respectively, to their desired values by pressing a pushbutton or like mechanism. The film sensitivity and shutter speed indication remain on display in the respective windows even after they have been changed, thereby allowing an operator to confirm the set values.

SUMMARY OF THE INVENTION

The primary object of the present invention is to improve and simplify photographic light measuring devices.

In view of the fact that the input data to be set includes data such as, for example, a shutter speed or diaphragm aperture value, which are frequently changed and are needed as data for indicating the exposure conditions for each photograph, and data, such as, for example, film sensitivity, which, once set, remain unchanged for a substantial time and are not necessarily needed as data for indicating the exposure conditions for every photograph, the present invention has a construction wherein the former data is always on display while the latter is displayed only when it is required. For that purpose, a single indicating means is used to display the former type of data at all times and the display is changed over to show the latter data only when it is required. This saves one indication means and results in a simplified construction, and thereby in a saving of the power consumption for a display. This arrangement also restricts the normally displayed information to what is necessary at the time, thereby avoiding any complex display.

Furthermore, according to the present invention, of the data selectively displayable only the data that is being displayed, may be changed. Thus, not only can the camera operator change the set data while monitoring the display in a similar manner to that for conventional devices, but also any unexpected change of the set data may be avoided.

According to an embodiment of the present invention, the combination of a shutter speed and a diaphragm aperture value necessary as exposure information is normally displayed, respectively, at a pair of display windows in accordance with manual setting and/or light measurement taking into account set exposure conditions. One of the display windows is commonly used to display film sensitivity in place of the shutter speed or diaphragm aperture value, whereby a set film sensitivity can be observed upon its setting.

Additionally, the present invention is applicable to a colorimeter with respect to the relationship between the display of a parameter as a function of a light measurement and other factors calculated therewith and the display of a parameter which is manually set. The manually set parameter may be a color temperature characteristic of a film, which is not required to change, once it has been set until the film is replaced. This enables the same display window to be selectively used for the normal display of a parameter related to light measurement, as well as for the display of a manually set parameter.

According to the present invention, an indicating means normally displays one or more values which are frequently changed and required as data for indicating the exposure conditions for each photograph, or displays a value as a function of a measurement. The same indicating means, in response to a desired change-over operation, displays values which remain unchanged for a substantial time once they are manually set. This results in a simplified display arrangement, any waste in power consumption being eliminated which will occur if the manually set data is constantly displayed while it does not frequently change. Also, this avoids any complexity of the display, thereby posing no problem of misreading necessary information. As a result, photographic light measuring devices may be considerably improved in comparison with conventional devices in terms of both construction and convenience of use.

DETAILED DESCRIPTION OF THE PREFERRED EMBODIMENTS

The slashed lines in the Figures represent a plurality of lines for transmitting a signal composed of a plurality of bits.

Figures 1, 2:
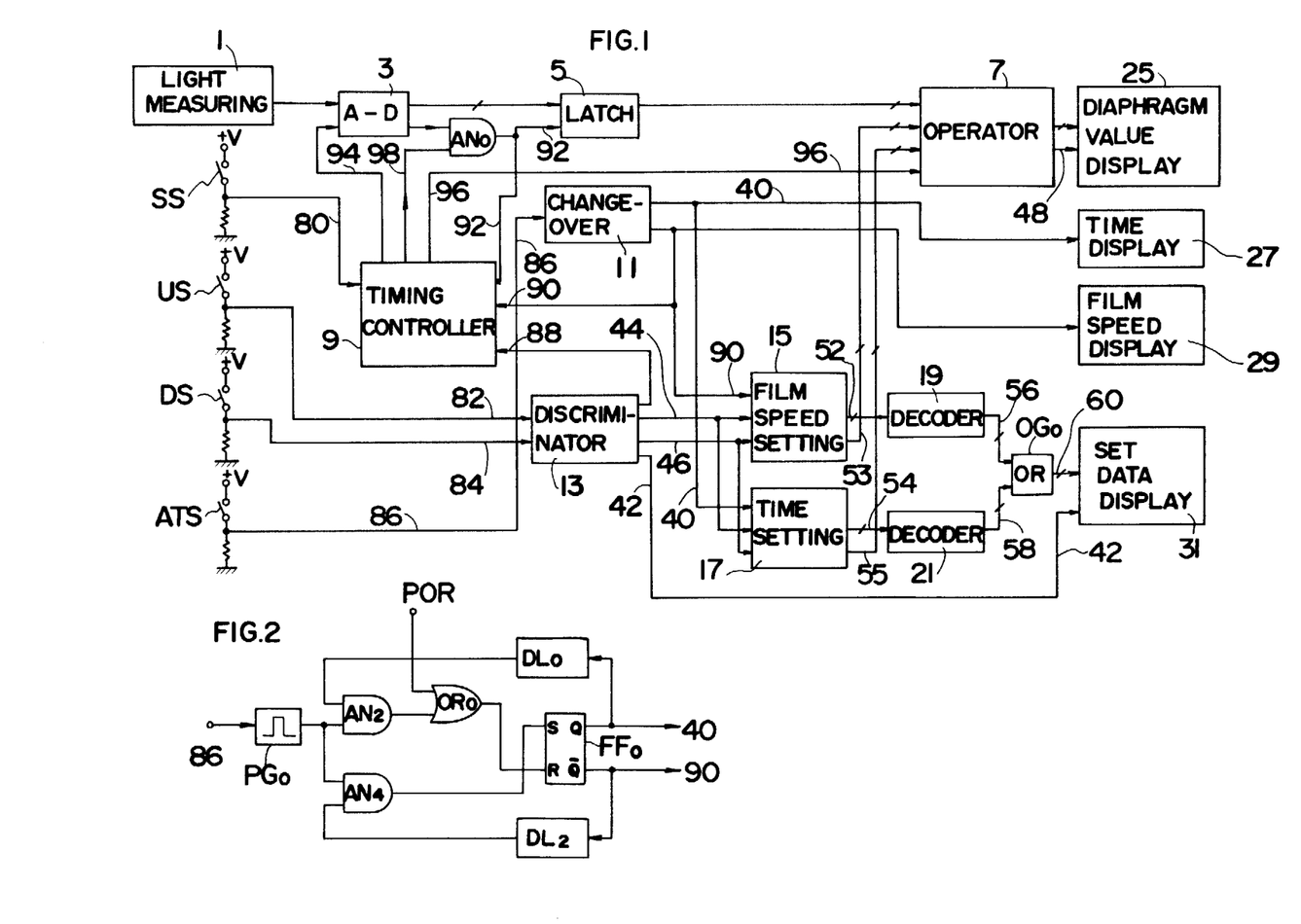
FIG. 1 is a block diagram illustrating an embodiment of the present invention.
FIG. 2 schematically shows a changeover circuit of FIG. 1.

With reference to FIG. 1, which shows a block diagram of a first embodiment of the present invention, light measuring circuit 1 generates an analog signal corresponding to a brightness value (Bv value) of a measured object represented by the unit in terms of the APEX system. A-D converter 3 starts to convert the analog signal from light measuring circuit 1 to a digital signal upon receipt of an initiation signal through line 94 from timing controller 9, and, after completion of the A-D conversion operation, generates a termination signal which is fed via AND gate ANo and line 92 to timing controller 9. Latch circuit 5 also receives the A-D conversion termination signal from line 92 to latch the digital signal from A-D converter 3 corresponding to the Bv value. Switch SS is closed when a light measuring button is depressed. Switch US is closed in response to a manual depression of an Up button to increase a set value. Switch DS is closed in response to a manual depression of a Down button to decrease the set value. Switch ATS is closed in response to a depression of a changeover button to select the data to be altered between film sensitivity and exposure time data.

Changeover circuit 11 provides a "High" level signal alternately through lines 90 and 40, changing the line selection in response to each closure of switch ATS. Discriminating circuit 13 discriminates between which switch US or DS is closed, and provides a pulse through line 44 when switch US is closed, and a pulse through line 46 when switch DS is closed. Also provided by discriminating circuit 13 are an indication start signal for a set value indication through line 42 and an A-D conversion initiating, or operation initiating, signal through line 88. Film sensitivity setting circuit 15 adds to or subtracts from its preregistered value, the value corresponding to the number of pulses from terminal 44 or 46 when the line 90 from changeover circuit 11 is at a "High" voltage level, and generates a signal representative of the finally registered value to data terminals 52 and 53. Exposure time setting circuit 17 adds to or subtracts from its preregistered value, the value corresponding to the number of pulses from terminals 44 and 46 when terminal 40 of changeover circuit 11 is at a "High" voltage level, and generates a signal representative of the finally registered value to data terminals 54 and 55. Display decoder 19 converts the data signal from data terminals 52 into a signal for film sensitivity indication, and when all the output at data terminals 52 are at a "Low" voltage level, all of the voltages at terminals 56 are "Low". Decoder 21 converts the data signal from data terminals 54 into a signal for exposure time indication, and when all the outputs of data terminals 54 are at a "Low" level, all of the outputs of data terminals 58 are "Low", as in decoder 19. OR block OGo includes a plurality of OR gates, through which a signal from decoder 19 or 21 is transmitted to data terminals 60. Operational or calculation circuit 7 receives an initiation signal through line 96 from timing controller 9 to collect data signals corresponding to a measured brightness value (Bv), set film speed value (Sv) and set shutter speed or exposure time value (Tv) from data terminals 50, 53 and 55, respectively, for performing the following calculation:

$$Bv + Sv - Tv = Av$$

and obtains a proper diaphragm aperture value (Av) suitable for the given data, and after completion of a calculation, generates a termination signal at terminal 48.

Diaphragm aperture value indicating device 25 collects calculated data from operational circuit 7 upon receipt of the terminating signal from terminal 48, and indicates a diaphragm aperture value based on the data. In response to a "High level" at line 40, indicating device 27 indicates that the exposure time setting may be changed while in response to a "High level" at line 90, indicating device 29 indicates that the film sensitivity setting may be changed. Indicating device 31 selectively indicates the set exposure time or film sensitivity.

With a power switch (not shown) ON, initial values (e.g., data corresponding to ASA100 and a shutter speed of 1/125 second) are respectively preregistered in film sensitivity setting circuit 15 and exposure time setting block 17. Also, at this time, terminal 90 of changeover circuit 11 is at a "High" level, and the initial film sensitivity value in film sensitivity setting circuit 15 is indicated by indicating device 31 in accordance with the signal supplied through decoder 19 and OR gate OGo. It should be understood that the initial value of a shutter speed is not generated from exposure time setting circuit 17 since terminal 40 is at a "Low" level. Moreover, a "High" level at line 90 is also applied to timing controller 9, and as a result, the A-D conversion of the output of light measuring circuit 1 is not performed, whereby no calculation is carried out and no diaphragm aperture value is indicated. With this condition, therefore, the film sensitivity alone is indicated by indicating device 31. This makes it possible to confirm the value of film sensitivity set in film sensitivity setting block 15. Furthermore, as terminal 90 is at a "High" level, pulses may be supplied through terminals 44 and 46 to film sensitivity setting circuit 15 to change the film sensitivity setting.

In more detail, a pulse is transmitted from discriminating circuit 13 to film sensitivity setting circuit 15 at each closure of switch US, and the value set in film sensitivity setting circuit 15 is increased by ⅓ step of Sv value per pulse. Similarly, the set value is decreased by ⅓ step each time switch DS is manually closed. The change in the set value can be monitored in indicating device 31. Also, at this time, terminal 40 is at a "Low" level, causing the value of a shutter speed to remain unchanged in exposure time setting circuit 17 even if pulses are transmitted through lines 44 and 46.

When switch ATS is manually closed once after the film sensitivity has been confirmed, or its set value has been changed, the output of changeover circuit 11 is inverted, causing terminal 40 to become "High" and terminal 90 to be "Low". As a result, the contents of film sensitivity setting circuit 15 are no longer transmitted to indicating device 31. Instead, the value of a shutter speed is transmitted from exposure time setting circuit 17 to indicating device 31 through display decoder 21 and OR gate OGo for indication. With this condition, when switch US or DS is manually operated, the contents of film sensitivity setting circuit 15 remain unchanged, while those of exposure time setting circuit 17 are changed. The change of a shutter speed can be monitored in indicating device 31. Additionally, as terminal 90 is at a "Low" level, if switch SS is closed light measurement and A-D conversion are carried out and a digital signal corresponding to a measured value is latched by latch circuit 5. Operational circuit 7 generates a digital signal corresponding to a diaphragm aperture value as a result of an electric calculation with the digital signal for the light measurement, a digital signal for a film sensitivity generated by film sensitivity setting circuit 15 and a digital signal for a shutter speed generated by exposure time setting circuit 7. The diaphragm value corresponding to the digital signal of the operational value is indicated by indicating device 25. Thus, the combination of a shutter speed and a diaphragm aperture value are indicated by the pair of indicating devices 25 and 31. Also, when the shutter speed of indicating device 31 is changed by operating switch US or DS, the diaphragm aperture value of indicating device 25 is correspondingly varied, allowing a choice of the combinations of a shutter speed and a diaphragm aperture value for correct exposure. At this time, film sensitivity is not indicated, causing no misreading of information.

When a change of film sensitivity is required, switch ATS is closed and opened once again, whereby the output of changeover circuit 11 is inverted, causing terminal 90 to become "High" and terminal 40 to be "Low", and the film sensitivity is indicated by indicating device 31, thereby enabling the film sensitivity to be altered. Also, since an A-D conversion initiation signal is not generated, the display of a diaphragm aperture value by indicating device 25 becomes unchangeable in accordance with a light measuring value. When the film sensitivity is changed, a diaphragm aperture value is calculated on the basis of the data stored in latch circuit 5, the changed film sensitivity and the data from exposure time setting circuit 17, and is indicated by indicating device 25. At this time, the changed film sensitivity is indicated by indicating device 31.

FIG. 2 schematically shows changeover circuit 11 of FIG. 1. With a power switch (not shown) closed, power-On reset signal POR is generated from a power-On reset circuit (not shown). Power-On reset signal POR is transmitted through OR circuit ORo to reset flip-flop FFo, causing terminal 90 to become "High", whereby film sensitivity setting becomes changeable. With switch ATS once closed, a signal from pulse generator PGo is transmitted through AND gate AN4 to reset flip-flop FFo, causing terminal 40 to become "High", whereby exposure time setting becomes changeable. At this time, delay circuits DLo and DL2 function to prevent the output of flip-flop FFo from returning to its original condition after its inversion while pulse generator PGo continues to generate pulses when the outputs of terminals 90 and 40 are inverted. It should be understood that delay circuits DLo and DL2 are not required if flip-flop FFo is of a master/slave type and a delay period of time from an input to an output is longer than the duration of the pulse from pulse generator PGo. With switch ATS closed again, a pulse from pulse generator PGo is transmitted through AND gate AN2 to reset flip-flop FFo, whereby the film sensitivity setting becomes available. In summary, every time switch ATS is closed, the film sensitivity changeable condition is changed over to an exposure time changeable condition or vice-versa. Furthermore, in response to this changeover, a corresponding value is indicated by either of indicating devices 27 and 29, while the value of film sensitivity or exposure time is indicated by indicating device 31.

Figure 3:
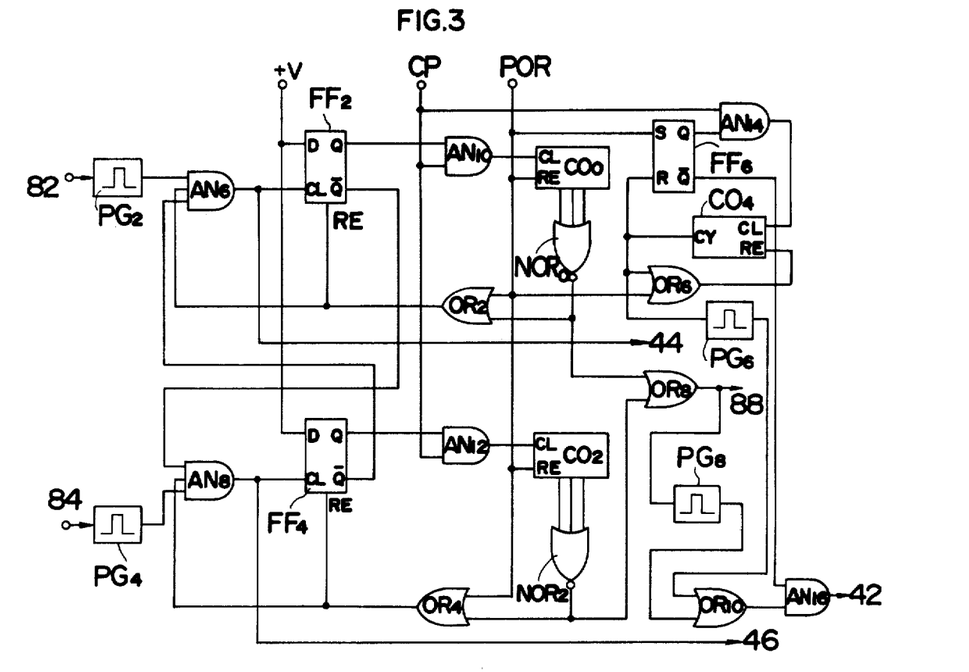
FIG. 3 schematically shows a discrimination circuit of FIG. 1.

FIG. 3 schematically shows the discriminating circuit of FIG. 1. With power ON, counters COo, CO2 and CO4 are reset by a power-ON reset signal, which also resets flip-flops FF2 and FF4, but sets RS flip-flop FF6, which, in turn, opens AND gate AN14, allowing an input of clock pulses to counter CO4. This causes counter CO4 to count the time required for an output of display data corresponding to the fixed data (e.g., ASA100) to be set on film sensitivity setting circuit 15 from OR gate OGo of FIG. 1. When carry terminal CY of counter CO4 becomes "High", flip-flop FF6 and counter CO4 are reset thereby, and a pulse is generated from pulse generator PG6. This pulse is transmitted through AND gate AN16 and line 42 and applied to indicating device 31, which indicates the numeral 100, for example representative of the film sensitivity. It is to be noted that with power ON, counters COo and CO2 are reset, causing the outputs of NOR circuits NORo and NOR2 to become "High", whereby a pulse may be generated from pulse generator PG3. In fact, however, flip-flop FF6 is set to close AND gate 16, thereby causing no pulse to be generated.

With switch US or DS closed, a pulse is generated from either of pulse generators PG2 and PG4. This voltage rise in the pulse causes output Q of flip-flop FF2 or FF4 to become "High" and passed through AND gate AN10 or AN12, and counter COo or CO2 counts the time required for OR gate OGo to generate data corresponding to a set value which has been changed at film sensitivity setting circuit 15 or exposure time setting circuit 17 in response to a pulse from AND gate AN6 or AN8. After counter COo or CO2 has completed counting, the output of NOR circuit NORo or NOR2 rises, and a signal from pulse generator PG8 is generated from terminal 42 through AND gate AN16. With this signal, indicating device 31 collects data from OR gate OGo to indicate the changed value. Moreover, AND gates AN6 and AN8 are closed while counter COo or CO2 is counting, so that a pulse from pulse generator PG2 or PG4 is not generated through AND gates AN6 and AN8. Furthermore, when all outputs become "Low" after counter COo or CO2 has completed counting and the output of NOR circuit NORo or NOR2 has risen, flip-flop FF2 is reset, causing the AND gate An10 or AN12 to be closed, whereby a clock pulse is no longer sent to counter COo or CO2. A signal at the output of NOR circuit NORo or NOR2 rising to "High" is transmitted from terminal 88 to timing controller 9, which in turn generates an operation initiating signal or an A-D conversion initiating signal, the description of which will be given later in detail.

Figure 4:
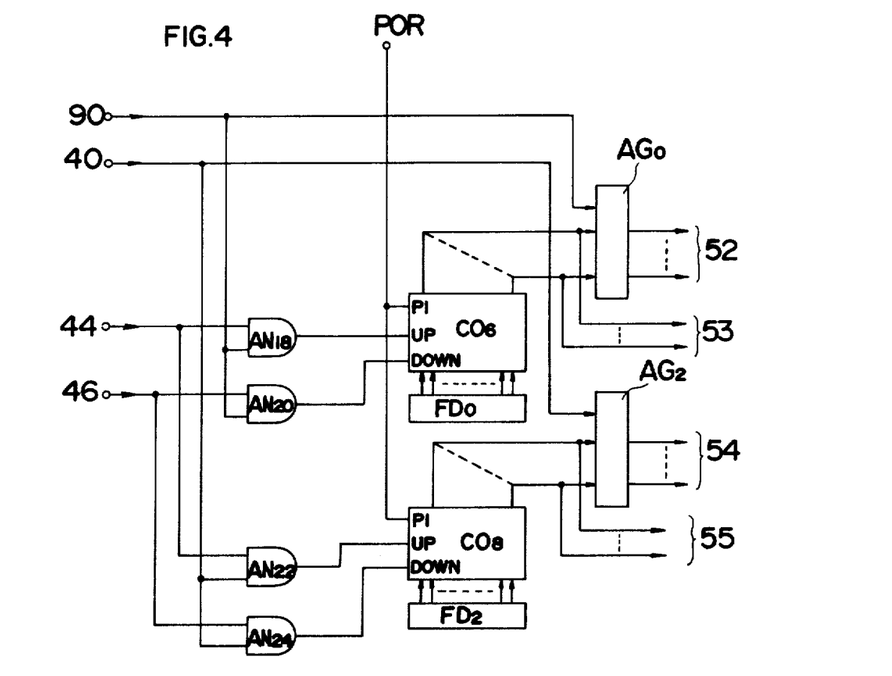
FIG. 4 schematically shows a setting circuit of FIG. 1.

FIG. 4 schematically shows the circuuits of film sensitivity setting circuit 15 and exposure time setting circuit 17 of FIG. 1. With power ON, power-ON reset signal POR causes presettable Up/Down counters CO6 and CO8 to receive parallel data from fixed data output circuits FDo and FD2 with the fixed data being preregistered in counters CO6 and CO8. At this time, the output of changeover circuit 11 at terminal 90 is at a "High" level, causing an indication corresponding to the data from AND gate AGo (e.g., ASA100) to be in effect. Furthermore, the set prefixed data (data corresponding to ASA100 and exposure time of 1/125 second) are generated from data terminals 53 and 55 to an operational circuit.

Normally, AND gates AN18 and AN20 or AN22 and AN24 are opened in accordance with the conditions of output terminals 90 and 40 of changeover circuit 11, and counter CO6 or CO8 counts up or down by "one" in response to a pulse from terminal 44 or 46 of discriminating circuit 13. Display decoders 19 and 21, as well as operational circuit 7 are constructed such that the data corresponding to the film sensitivity from counter CO6 are varied for ⅛ Ev, for example, and the data corresponding to the exposure time for 1 Ev by counter CO6 or CO8 which counts up or down by "one".

Figure 5:
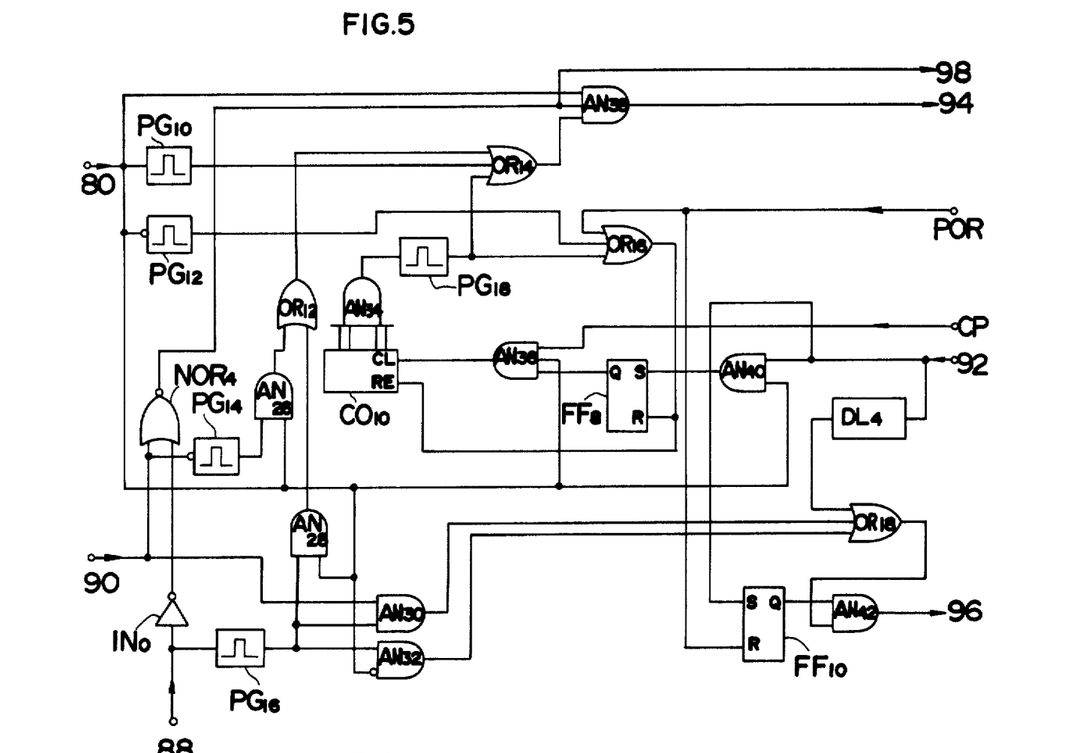
FIG. 5 schematically shows a timing controller circuit of FIG. 1.

FIG. 5 schematically shows a circuit diagram of timing controller 9 of FIG. 1. When terminal 90 is at a "Low" and terminal 88 at a "High" level, i.e., when exposure time setting is changeable, switch US or DS has been closed for a specific period of time, and switch SS is also closed, AND gate AN38 is opened, enabling an A-D conversion initiation signal to be generated from terminal 94. When switch SS is closed under these conditions, pulse generator PG10 generates a pulse in response to the voltage signal rise at terminal 80, and this pulse is generated as an A-D conversion initiation signal from terminal 94. Furthermore, when power is on with switch SS remaining closed, terminal 90 is at a "High" level, as is apparent from FIG. 2, causing no A-D conversion initiating signal to be generated. Also, when the voltage at terminal 90 rises from a "Low" to "High" level with light measuring switch SS remaining closed, that is, when a changeover is made so that a change of exposure time is possible, a pulse from pulse generator PG14 is generated as an A-D conversion initiating signal. Furthermore, when switch US or DS has been closed for a specific period of time while light measuring switch SS remains closed, the voltage at terminal 88 rises, and this signal causes pulse generator PG16 to generate a pulse, which is generated as an A-D conversion initiation signal through AND gate AN28. Moreover, when an A-D conversion termination signal is applied from terminal 92, flip-flop FF8 is set if light measuring switch SS is closed, whereby AND gate AN36 is opened, enabling the application of a clock pulse to counter CO10, which counts a specific period of time, causing the output of counter CO10 to become "High". In response to the voltage rise of that signal, pulse generator PG18 generates an A-D conversion initiating pulse, and at the same time, flip-flop FF8 and counter CO10 are reset. It should be understood that the specific period of time corresponds to the time required for the data to be A-D converted and latched by latch circuit 5, operation to be carried out by operational circuit 7 and display to be made by indicating device 25 for a specific period of time.

An operation initiating signal from terminal 96 is not generated unless an A-D conversion terminating signal is once given after power has been ON. In more detail, flip-flop FF10 is reset with power ON, and AND gate AN42 is closed, and with an A-D conversion termination signal being input, flip-flop FF10 is set to open AND gate AN42. A calculation initiating signal is generated after the A-D conversion terminating signal has been delayed by delay circuit DL4 from the application of the signal, for the time required for the operation of latch circuit 5. Also, when the set value is changed under the condition where film sensitivity setting is changeable, i.e., where the voltage at terminal 90 is at a "High" level, the voltage at terminal 88 rises to a "High" level, causing a pulse from pulse generator PG16 to be generated through AND gate AN30, and this pulse is generated as an operation initiating signal. Furthermore, when the set value is changed with light measuring switch SS remaining opened, a pulse from pulse generator PG16 is also generated through AND gate AN32, and this pulse serves as a calculation initiating signal.

When the voltage at terminal 90 becomes "High" with switch US or DS closed or switch ATS is closed during A-D conversion, the voltage at terminal 98 becomes "Low", causing AND gate ANo to be closed, whereby an A-D conversion terminating signal is no longer applied to timing controller 9 and latch circuit 5.

Also, when light measuring switch SS is opened, flip-flop FF8 and counter CO10 are reset by a pulse from pulse generator PG12, and an A-D conversion initiating signal is not generated until switch SS is closed again.

Figure 6:
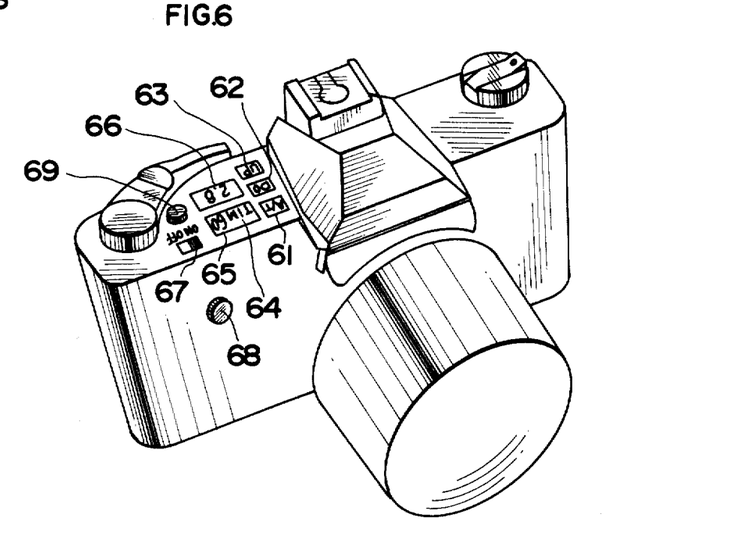
FIG. 6 is an external view of a camera, to which the present invention is applied.

FIG. 6 is an external view of a camera embodying the circuitry of the invention. The power switch is 67, and light measuring button 68 is used to close switch SS and changeover button 61 closes switch ATS. Down button 62 closes switch DS and up button 63 closes switch US. Indicator 64 indicates which setting is changeable, and a display by indicating devices 27 and 29 of FIG. 1 is shown in indicator 64. Indicator 65 indicates the set value of the selected parameter for display by indicating device 31 of FIG. 1. Window 66 indicates the calculated value of an exposure factor, such as a diaphragm value, for display by indicating device 25 of FIG. 1. Release button 69 initiates the exposure control operation of the camera.

Figure 7:
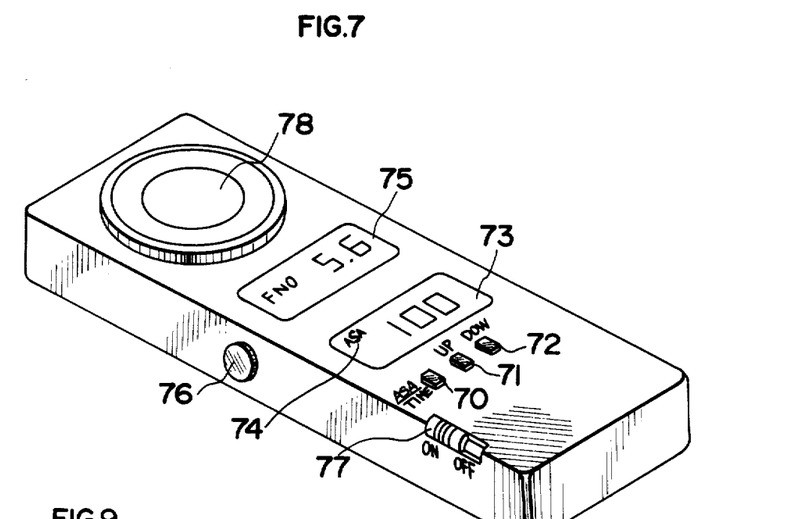
FIG. 7 is an external view of an exposure meter, to which the present invention is applied.

FIG. 7 is an external view of an exposure meter to which the present invention may also be applied. Mounted on the exposure meter are power switch operation slider 77, light measurement button 76, changeover button 70, Up button 71 and Down button 72. Indicator 74 indicates which setting is changeable, while indicator 73 indicates the set value of the selected parameter, indicator 75 indicates the calculated exposure value as a function of a light measurement and set parameters, and light receiving sphere is element 78.

It should be noted that although the present embodiment has been described in which the film sensitivity and the shutter speed are set to calculate a diaphragm aperture value, it is possible for similar circuitry to be applied for the calculation of exposure time from the set film sensitivity and diaphragm aperture value, and the embodiment is also applicable to a so-called programming type in which the film sensitivity alone is set to calculate a specific combination of diaphragm aperture value and exposure time by using first and second calculation means. In this case, an embodiment may include a first indicating means (corresponding to indicating device 31 of FIG. 1) selectively displaying information of the value given by the first calculation means or information of a set value, as well as a second indicating means (corresponding to indicating device 25 of FIG. 1) displaying information of the value given by the second calculation means.

In addition, the present invention is applicable to an indicating device which displays both the number of the unexposed or exposed frames of a film and a set exposure control value.

Furthermore, the present invention is applicable not only to a type of device that counts the number of pulses for setting values, but also to another type of device that sets values using a digital code and displays set values by an indicating device in common use.

With the present embodiment, the previous description was directed to a photographic light measuring device in which a pulse is generated when a setting switch is once closed. It is easy for the embodiment to be changed to a type in which a pulse train is generated while a setting switch is closed.

Figure 8:
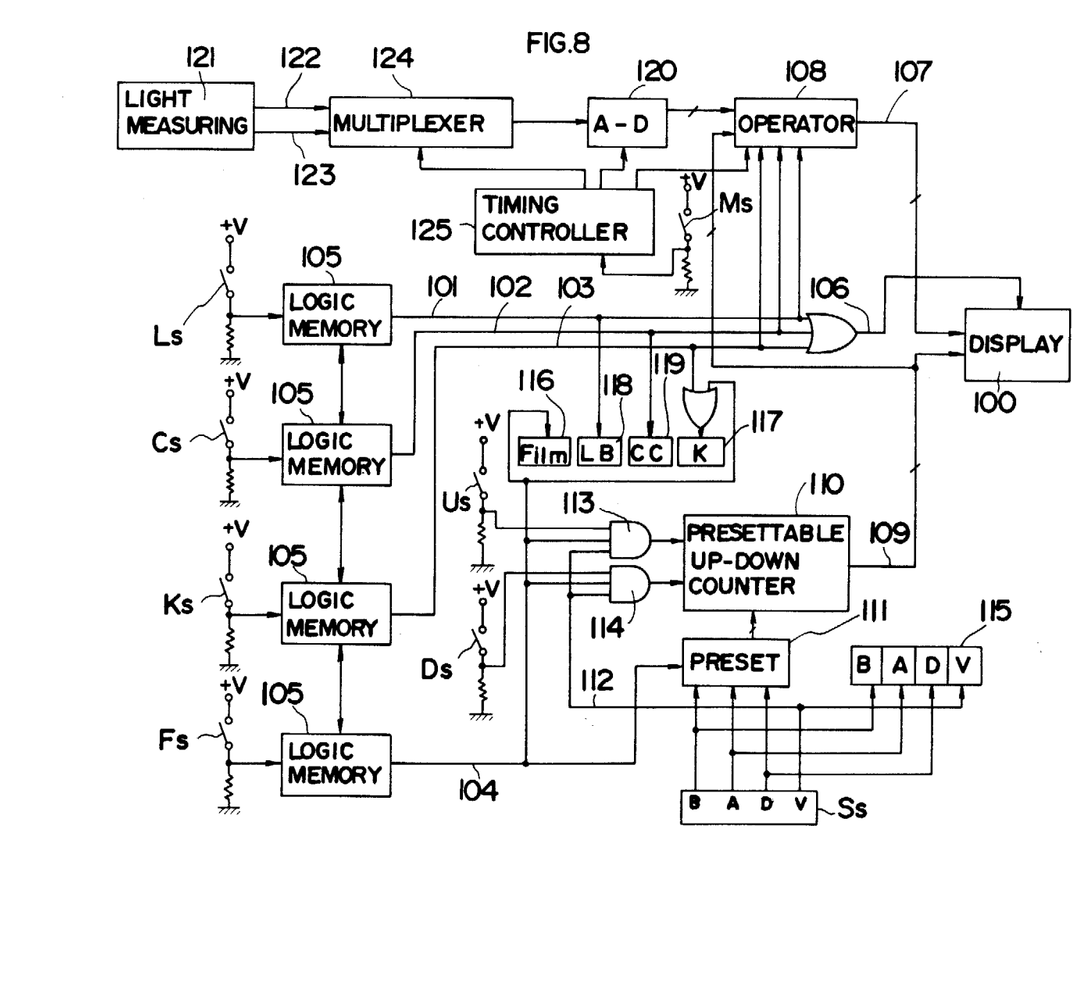
FIG. 8 is a block diagram illustrating another embodiment of the present invention.
Figure 9:
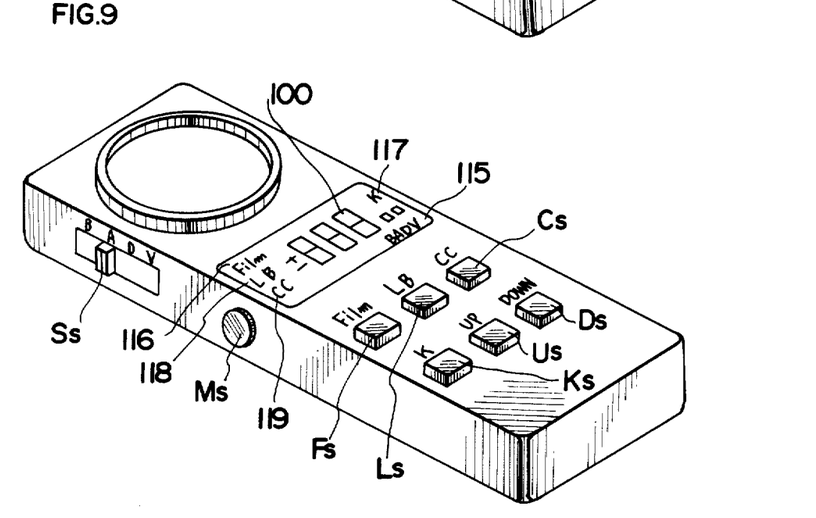
FIG. 9 is an external view of a colorimeter embodying the circuitry of FIG. 8.

FIGS. 8 and 9 illustrate a third embodiment where the present invention is applied to a colorimeter. FIG. 8 is a circuit block diagram and FIG. 9 is an external view of the housing thereof. Indicating means 100 comprises a 3-digit, 7-segment display element and a supplemental zero display for the lowest two digits and is used for both display of setting information and measured and calculated information. Selector switches Ls, Cs, Ks and Fs are used to select the parameter to be indicated by indicating means 100, and are combined with logic memory circuit 105 so that when one of the switches is closed or opened upon depression of the corresponding button, a voltage at a corresponding one of terminals 101 through 104 becomes "High" and others remain "Low". The voltage at display selection terminal 106 becomes "High" when the voltage at one of terminals 101, 102 and 103 is at a "High" level, thereby controlling indicating means 100 so that a calculated result sent from operational circuit 108 through terminal 107 may be displayed. However, when switch Fs is closed or opened, causing the voltage at terminal 104 to become "High", the voltage at terminals 101, 102 and 103 all remain "Low", whereby the voltage at display selection terminal 106 also remains "Low", and indicating means 100 is controlled to display set information sent from Up-Down counter 110 through terminal 109. The set information may be a color temperature characteristic of a film, which, once set, need not be changed, until the film is replaced with one of another type. This allows indicating means 100 to indicate information in Up-Down counter 110 only when the set value is to be changed. Under normal operation, indicating means 100 is used to display a measured and calculated result from operational circuit 108.

With a power switch (not shown) ON, the voltage at terminal 104 becomes "High", and the voltage at terminals 101, 102 and 103 remains "Low". As a result, indicating means 100 displays the contents of presettable Up-Down counter 110, making it possible to confirm the setting information. When selector Ss is set to either of positions B, A and D, an output representative of a predetermined value depending on the selected film type is generated from preset means 111 and applied to presettable Up-Down counter 110 to be registered therein. With selector Ss being moved to another setting position among B, A and D, the contents of presettable Up-Down counter 110 are correspondingly varied, and the new contents can be monitored by indicating means 100. Also, when selector Ss is set to position V, the voltage at terminal 112 becomes "High", enabling a pulse to be sent to presettable Up-Down counter 110 after passing through AND gates 113 or 114 in response to the operation of switch Us or Ds, so that the contents of presettable Up-Down counter 110 may optionally be increased or decreased depending on which of switches Us or Ds is operated. The contents of counter 110 being changed is observed with indicating means 100. It should be understood that the setting of selector Ss at either position B, A, D or V is indicated by selection indicating means 115. In addition, when the voltage at terminal 104 is at a "High" level, display element 116 lights up to indicate that the color temperature characteristic of a film is on display, and display element 117 also lights up to indicate the color temperature unit "K".

When either of switches Ls, Cs and Ks is closed or opened upon completion of confirmation or change of the selection of the color temperature characteristics, the voltage of one of corresponding terminals 101, 102 and 103 becomes "High", whereby the voltage at terminal 104 is reset to become "Low". This stops a signal from being transmitted from presetting means 111 and AND gates 113 and 114 to presettable Up-Down counter 110, the contents of which become unchangeable. Also, the voltage at terminal 106 becomes "High", causing indicating means 100 to indicate the contents of operational circuit 108. An operational mode is designated for operational circuit 108 according to which one of terminals 101, 102 and 103 is at a "High" voltage level, and one of corresponding operational mode display elements 118, 119 and 117 lights up. With light measuring switch Ms closed or opened under this condition, a calculation is performed in accordance with a designated operation mode with a signal from A-D converter 120 representative of a digitally measured value and a signal from presettable Up-Down counter 110, and the result of the calculation is sent as an input to indicating means 100.

Light measuring means 121 generates outputs representative of a ratio Mb of intensities of blue B and red R light components, and of ratio Mg of intensities of green G and red R light components from output terminal 123. Multiplexer 124 is controlled by timing controller 125 to transmit such intensity ratios to A-D converter 120 under time division. A-D converter 120 is controlled by timing controller 125 to A-D convert the intensity ratios under time division, and the digital signals of A-D converter are transmitted to operational circuit 108 for storage. When switch Ls is closed or opened and the voltage at terminal 101 is at a "High" level, an LBF (Light Balancing Factor) operational mode is initiated which performs a calculation of Mb-Mf with intensity ratio Mb and film color temperature characteristic Mf which is generated from presettable Up-Down counter 110 and stored in operational circuit 108. When switch Cs is closed or opened and terminal 102 is at a "High" voltage level, a CCF (Color Compensating Factor) operational mode is initiated, which performs a calculation of Mg-Mb. Also, when switch Ks is closed or opened and terminal 103 is at a "High" voltage level, the operational mode is of a type that performs a calculation of a light source color temperature for 10/Mb. Timing controller 125 starts operating when light measuring switch Ms is closed or opened, thereby controlling A-D conversion as well as the timing of operations, as described above.

What is claimed is:

1. A photographic light measuring device comprising:
   means for detecting light of an object and generating an output signal as a function thereof;
   A-D converter means for converting said output signal into a digital signal;
   a first setting means for generating a first digital set signal representative of first manually set data;
   a second setting means for generating a second digital set signal representative of second manually set data;
   varying means for selectively controlling said first and second setting means for varying said first and second digital set signals in response to a manual operation;
   calculation means for calculating with said digital signal from said A-D converter means, said first set digital signal and said second set digital signal, and generating a calculation output signal as a result of the calculation;

a first indication means for indicating data commensurate with said calculation output signal;

a second indication means for selectively indicating either one of the data commensurate with said first and second digital set signals; and selection means for selecting the data to be indicated by said second indicating means.

2. A photographic light measuring device as in claim 1 wherein the signals generated by said control means prevents said first and second setting means from varying said first said second digital set signals when said second indication means does not indicate either of them.

3. A photographic light measuring device as in claim 1 further comprising timing controller means for preventing the operation of said A-D converter means when said selection means selects said first or second digital set signal to be indicated by said second indication means.

4. A photographic light measuring device comprising:

means for detecting light from an object and generating plural kinds of exposure signals as a function of light measurements;

A-D converter means for converting said exposure signals into digital signals;

setting means for selectively generating digital set signals representing different photographic parameters;

means for changing said digital set signals in response to a manual operation;

operational means for selectively making different calculations using said digital signals from said A-D conversion means and said digital set signals, and generating a calculated output signal as a result of the executed calculation;

a first selection means for selecting, in response to a manual operation, the calculation to be executed by said operational means;

indication means for selectively indicating the data commensurate with said digital set signals and said calculated output signal, said first selection means being coupled with said indication means such that the latter indicates the calculated output signal with said first selection means selecting any calculation;

second selection means for enabling indication of selected data commensurate with said digital set signals in place of the indication of the data commensurate with said calculated output signal; and timing controller means for preventing change of said digital set signals when the data commensurate with the calculated output is indicated.

5. A photographic light measuring device as in claim 1 wherein said selection means includes control means for generating signals to condition said first and second setting means to respond to said varying means.

6. A photographic light measuring device as in claim 5 wherein said varying means includes a common varying signal generator for generating varying signals and said first and second setting means are selectively responsive thereto in accordance with said signals generated by said control means.

* * * * *